(12) United States Patent
Zhang et al.

(10) Patent No.: US 10,846,324 B2
(45) Date of Patent: Nov. 24, 2020

(54) DEVICE, METHOD, AND USER INTERFACE FOR MANAGING AND INTERACTING WITH MEDIA CONTENT

(71) Applicant: Alibaba Group Holding Limited, George Town (KY)

(72) Inventors: Junwen Zhang, Hangzhou (CN); Lin Kang, Beijing (CN); Yan Cheng, Beijing (CN)

(73) Assignee: Alibaba Group Holding Limited (KY)

( * ) Notice: Subject to any disclaimer, the term of this patent is extended or adjusted under 35 U.S.C. 154(b) by 171 days.

(21) Appl. No.: 16/047,494

(22) Filed: Jul. 27, 2018

(65) Prior Publication Data

US 2019/0026313 A1    Jan. 24, 2019

Related U.S. Application Data

(63) Continuation-in-part of application No. PCT/CN2017/071559, filed on Jan. 18, 2017.

(30) Foreign Application Priority Data

Jan. 28, 2016 (CN) .......................... 2016 1 0059928

(51) Int. Cl.
| | | |
|---|---|---|
| G06F 16/00 | (2019.01) | |
| G06F 16/583 | (2019.01) | |
| G06F 16/487 | (2019.01) | |
| G06F 16/48 | (2019.01) | |
| G06F 16/44 | (2019.01) | |

(52) U.S. Cl.
CPC .......... *G06F 16/5838* (2019.01); *G06F 16/00* (2019.01); *G06F 16/44* (2019.01); *G06F 16/487* (2019.01); *G06F 16/489* (2019.01); *G06F 16/5854* (2019.01)

(58) Field of Classification Search
None
See application file for complete search history.

(56) References Cited

U.S. PATENT DOCUMENTS

| | | |
|---|---|---|
| 2006/0078201 A1 | 4/2006 | Kim |
| 2006/0153460 A1 | 7/2006 | Kim |
| 2008/0098316 A1* | 4/2008 | Declan ................... G06F 16/58 715/764 |
| 2008/0130960 A1 | 6/2008 | Yagnik |
| 2011/0123120 A1 | 5/2011 | Quack |
| 2014/0250126 A1 | 9/2014 | Baldwin |

(Continued)

FOREIGN PATENT DOCUMENTS

| | | |
|---|---|---|
| CN | 101107603 | 1/2008 |
| CN | 101378431 | 3/2009 |

(Continued)

*Primary Examiner* — Delomia L Gilliard
(74) *Attorney, Agent, or Firm* — Van Pelt, Yi & James LLP

(57) ABSTRACT

A method for content processing, including: classifying a plurality of media content items into corresponding categories; determining, based at least in part on a category, a content label and display information associated with the content label, wherein: the category corresponds to an item of media content; the content label corresponds to the category; and the display information indicates a display area for displaying the content label on a display interface; and displaying the content label based at least in part on the display information on the display interface.

20 Claims, 5 Drawing Sheets

(56) References Cited

U.S. PATENT DOCUMENTS

2015/0227531 A1* 8/2015 Kulesza .............. G06F 3/04817
                                                715/739
2017/0357382 A1* 12/2017 Miura ................... G06F 3/0481

FOREIGN PATENT DOCUMENTS

| CN | 103995889 | | 8/2014 | | |
| CN | 103995889 A | * | 8/2014 | | |
| CN | 104615769 | | 5/2015 | | |
| CN | 104750848 | | 7/2015 | | |
| CN | 104765877 | | 7/2015 | | |
| WO | WO-2017129018 A1 | * | 8/2017 | ......... | G06F 16/5838 |

* cited by examiner

DEVICE, METHOD, AND USER INTERFACE FOR MANAGING AND INTERACTING WITH MEDIA CONTENT

CROSS REFERENCE TO OTHER APPLICATIONS

This application is a continuation-in-part of and claims priority to International (PCT) Application No. PCT/CN2017/71559 entitled PICTURE PROCESSING METHOD AND APPARATUS, AND SMART TERMINAL filed Jan. 18, 2017 which is incorporated herein by reference for all purposes, which claims priority to People's Republic of China Patent Application No. 201610059928.6 entitled A METHOD, MEANS, AND SMART TERMINAL FOR PROCESSING PICTURES filed Jan. 28, 2016 which is incorporated herein by reference for all purposes.

FIELD OF THE INVENTION

The present application relates generally to the field of terminal device technology and more particularly, to a device, method, and user interface for managing and interacting with content.

BACKGROUND OF THE INVENTION

With the development of terminal device technologies, it is increasingly popular for users to use terminal devices (e.g., smart phones, tablet computers, etc.) to capture content (e.g., pictures, voice memos, video clips, notes, screenshots) or download content (e.g., pictures, MP3 files, video clips, documents) onto such devices. As a result, terminal devices have become a major reservoir where a large amount of content is stored.

When searching for specific content (e.g., particular pictures, video clips) at a terminal device storing a large amount of content, a user of the terminal device typically browses the entire collection of the content in order to locate the particular items of interest. For example, a tiling of thumbnails is displayed on the display screen of the terminal device for to the user to scroll through and to visually identify the content searched for. As such, the task of content search at a terminal device typically is difficult, cumbersome, and time-consuming.

Thus, there exists a need to enable users to search for pictures stored at a terminal device in a fast and convenient manner.

BRIEF DESCRIPTION OF THE DRAWINGS

Various embodiments of the invention are disclosed in the following detailed description and the accompanying drawings.

DETAILED DESCRIPTION

Figure 1:
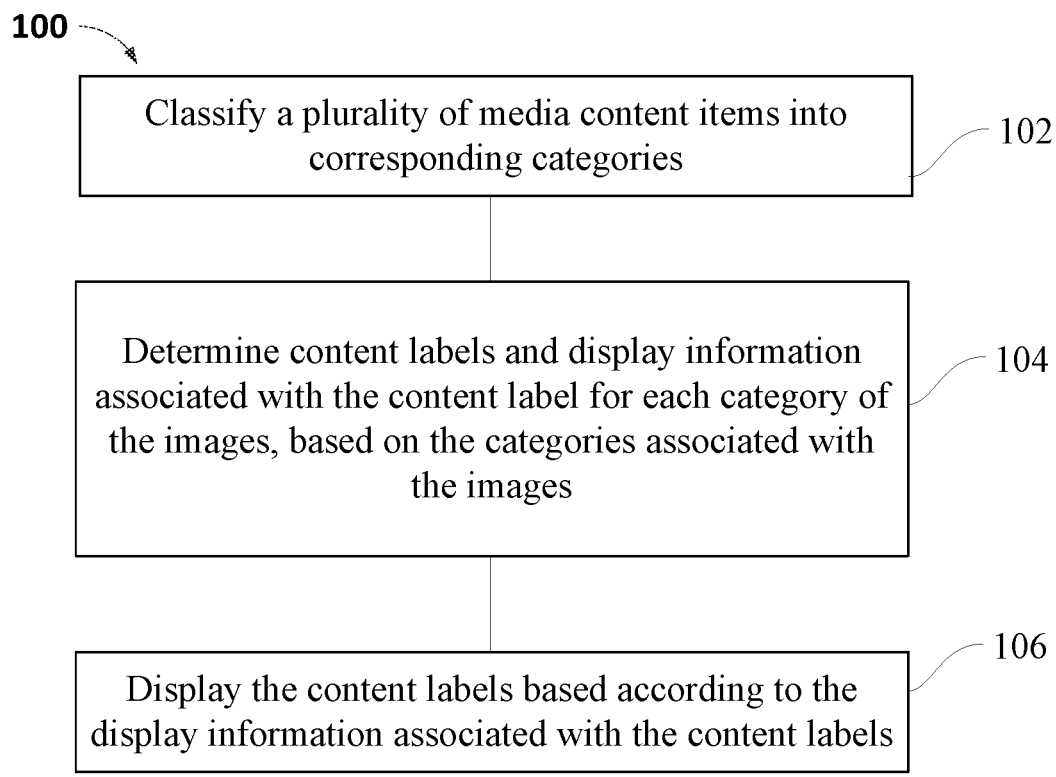
FIG. 1 is a flow chart illustrating an example process for content processing, in accordance with one or more embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for managing and interacting with content via a terminal device are described herein. In implementations, a plurality of media content (e.g., photographs, video clips, documents, chat histories, audio files) is classified into (e.g., classified as belonging to) various content categories so as to facilitate the management of and interaction with the plurality of content by the user. Content categories are used to determine corresponding content labels, for each of which display information is determined accordingly. Display information indicates how a content label is to be displayed at a user interface on a display screen. For example, display information can specify a display area for displaying its corresponding content label on a user interface of a display screen. By presenting the content labels based on their corresponding display information, the content is presented to the user according to the content categories, contributing to a more convenient, simplified and yet efficient way for the user to navigate through the plurality of content and to locate particular content searched for.

According to various embodiments of the present disclosure, a terminal device can be a single device, a component of a device, a composite device having multiple components, or the like. For example, a terminal device can include a mobile phone, a computer, a smart household device, a wearable device, a smart medical device, an in-vehicle device, an Internet of Things (IoT), device etc. A mobile phone device can include, for example, a smart phone. A computer device can include, for example, a server computer, a personal computer, a notebook computer, a tablet computer, and the like. A smart household device can include, for example, a smart television set, a smart home security system, and the like. A wearable device can include, for example, a smart watch, a pair of smart glasses, a smart wrist-band, smart accessories, and the like. A smart medical device can include, for example, a smart blood pressure gauge, a smart bodyweight scale, and the like. An in-vehicle device can include, for example, a smart on-board information system for traffic information, cellular communication, vehicle diagnosis, navigation system, warning system, emergency system, entertainment system, and the like. In particular, a terminal device can include a terminal device equipped with the multimedia capabilities to support audio, video, and data-based services. In some embodiments, a terminal device includes a touch screen. In some embodiments, a terminal device includes a touchless screen and is capable of recognizing user inputs in a touch free (e.g., a user's gestures) manner.

According to various embodiments of the present disclosure, media content includes images, video content, and the like. For example, photographs can include photographs (e.g., two dimensional, three dimensional, etc.) captured by a user using a terminal device (e.g., a smart phone, a camera, etc.), images downloaded from the Internet by a user using a terminal device (e.g., a smart phone, a tablet computer, etc.), and screenshot images captured by a user using a terminal device (e.g., a smart phone, a game console, etc.). For purposes of simplicity, only images are used as example content to illustrate various embodiments of the present disclosure. It should be understood that other appropriate types of content such as video can be managed and searched for according to various embodiments of the present disclosure, without limitation. Such content can be stored locally at a terminal device, or hosted at a server or a server farm remote from a terminal device. In the latter case, a terminal device is configured to access content stored at the server or the server farm over a network. The network can be any network or combination of networks that enable communication between the terminal device and the server/server farm. The network can include, for example, a wired (e.g., Ethernet), or a wireless (e.g., 5G, Wi-Fi, Bluetooth) network. Such network can include a local area network, and/or wide area network. The network can support protocols including World Wide Web, Internet, cloud services, IoT service, and the like.

According to various embodiments of the present disclosure, the displaying of content labels based on the display information that corresponds to various content categories facilitates presenting content to a user in a categorized manner. As a result, not only is it more convenient for the user to search the entire collection of content for particular items of interest, the searches are also simplified and the search efficiency is enhanced.

FIG. 1 illustrates a flow chart of an example process for content processing in accordance with an embodiment of the present disclosure. In this example, the type of content is an image, and it should be understood that any type of content can be processed herein without limitation. Process 100 can be implemented at, for example, system 400 of FIG. 4.

Process 100 starts at 102, where a plurality of media content items are classified into corresponding categories.

With a large amount of images such as photographs, digital wall papers, and screenshots stored and accumulated over time at either a terminal device or a hosting server, it is cumbersome for a user to search for a particular image of interest from the large collection of images. By classifying images into categories and displaying content labels corresponding to the categories associated with the images, it becomes much easier for the user to locate a particular image despite the size of the image collection.

In some embodiments, the images are stored locally at a terminal device. In some embodiments, the images are hosted at a remote server and/or server farm over a network. The images to be classified are first identified into categorized collections of images such that categories can be determined and assigned to each image in the collection. In implementations, the images can be copied into a centralized folder (e.g., saved from messaging Apps into the camera roll folder of the Photos App). As described in more detail with reference to FIG. 2 below, the categories associated with the images can be classified based on various information pertaining to the images. Such information includes, for example, source information (e.g., camera captured, downloaded, screen captured), content information (e.g., scenery, presence of people) information, time information (acquisition time, sharing time), descriptive information and/or annotations (e.g., favorites, photo tags) associated with an image or a portion of an image. For example, an image can be classified as a scenery, a screenshot, a recent photograph, a photograph captured within the last year, a photograph captured in Beijing, a photograph captured recently in Beijing, and the like. An image can be indexed in association with multiple categories, which are not exclusive of each other. It should also be understood that the above-described information pertaining to images are intended as examples only, and any information can be utilized herein without limitation.

At 104, content labels and display information associated with the content labels are determined for each category of the images, based on the categories associated with the images.

At 106, the content labels are displayed according to the display information associated with the content labels.

For each category determined, a corresponding content label and display information associated with the content label are determined based on category information (e.g., information pertaining to the images associated with a category) associated with the category. The display information indicates how a content label is to be displayed at a user interface on a display screen. For example, the display information can dictate a display area in which the content label is to be displayed by specifying parameters such as the size and/or shape of the display area, the position of the display area relative to the user interface and/or the display screen, the font size, the text color, the background color, the animation effect, and the like. As such, content labels are presented to the user according to the properties of their respective categories. For example, the size and location of the above-described display area can be configured based on the quantity of images associated with the category corresponding to the content label, the lapse of time between the timestamp associated with the category corresponding to the content label and a reference point of time (e.g., the present time), the location distance between the geo-location associated with the category corresponding to the content label and a reference geo-location (e.g., the user's present geo-location), and the like. As described in more detail below, the larger the number of images associated with a category, the larger a size and/or more prominent a screen position is configured in the corresponding display information. By displaying content labels based on the respective display information, information associated with the content (e.g., timestamp, geo-location, quantity) is presented to the user in an intuitive manner, facilitating the user to navigate through the collection of images and search for a particular content of interest. As a result, not only is the search and retrieval of particular images simplified, the search efficiency is also improved despite the volume of a collection of images.

Figure 2:
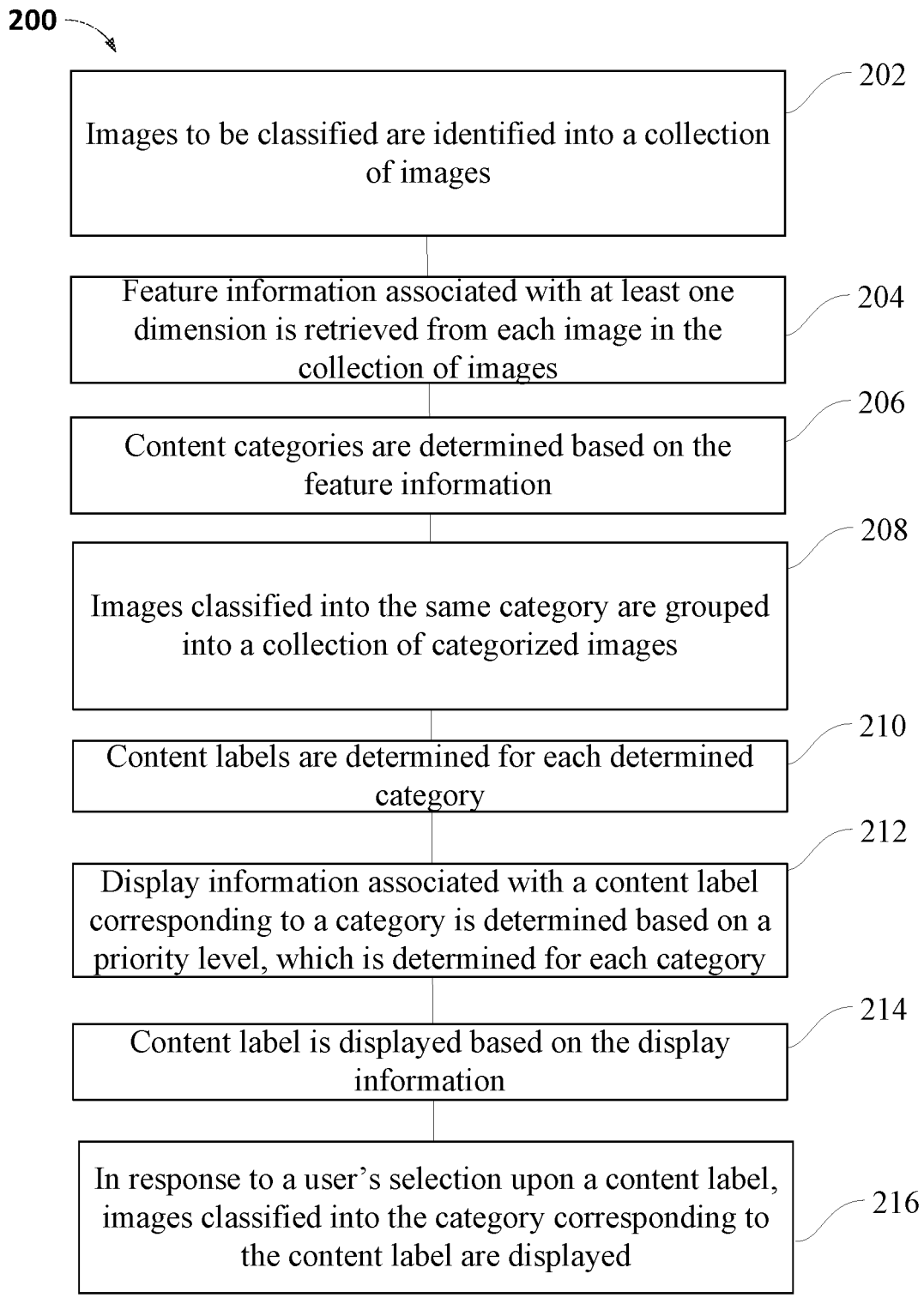
FIG. 2 is a flow chart illustrating another example process for content processing, in accordance with one or more embodiments of the present disclosure.

FIG. 2 illustrates a flow chart of an example process for content processing in accordance with an embodiment of the present disclosure. FIG. 2 can be implemented at, for example, system 400 of FIG. 4.

In order to determine a content label associated with various categories of images, the images are classified into a categorized collection of images. In implementations, content attributes associated with each image to be classified are identified first. Subsequently, images are categorized into collections of images based on the categories corresponding to the content attributes. For example, various types of dimension features such as image features (e.g., scenery, filtered images), acquisition time (e.g., date and/or time of acquisition), acquisition geo-locations, sources, etc. can be designated as feature information, based on which corresponding categories are determined. With the respective categories identified, images are grouped into a categorized collection of images accordingly.

By determining categories based on image attributes associated with images, and determining content labels based on the respective categories, the determined content labels are configured to reflect the properties of categorized images. Therefore, when such content labels are presented to a user, an intuitive arrangement of the categorized images are provided to facilitate the user's navigation through the images and searches of particular images of interest. As such, not only is the search and retrieval of particular images simplified, the search efficiency is also improved despite the volume of a collection of images.

Process 200 starts at 202, where images to be classified are identified into a collection of images.

In some embodiments, the images to be classified are stored at a terminal device (e.g., smart phone). In some embodiments, the images to be classified are hosted at a server or a server farm over a network. In the latter case, the images associated with various hosting services can be consolidated or linked into a central repository. In some embodiments, the images at the terminal device and the images at the hosting server are combined for being classified into a categorized collection.

In implementations, the images stored at the terminal device can be collected by browsing through all the data storages (e.g., file folders, Apps) of the terminal device. For example, the images included in the camera roll folder of the Photos App, and the images designated as favorites in the WeChat App can be retrieved for inclusion as part of the collection of images for classification. Additionally, the images stored at a network (e.g., a cloud service) under the user's accounts can also be collected by accessing the images hosted at the network storage. Images can include photographs captured by a camera, images downloaded from the Internet, images captured as screenshots, and the like. Images can be stored locally at the terminal device, or retrieved over a network from a database, a hosting server, or other devices.

At 204, feature information associated with at least one dimension is retrieved from each image in the collection of images.

In some embodiments, the at least one dimension is defined by a user who owns the images for classification. For example, the user can specify, at a content management application, criteria for indexing the images along a time dimension with various granularity such as images captured within at last weekend, a month ago, half a year ago, etc. Likewise, the user can specify the criteria along a geo-location dimension (e.g., images captured at a user's home town, at Beijing, at Lijiang, etc.), along a geo-location dimension associated with events (e.g., images captured at a birthday party, at a summer camp, at Wimbledon tournament, etc.), and so on. In some embodiments, the at least one dimension is defined by a content management application/services (e.g., a training module associated therewith). In this case, the definition of applicable dimensions can be generated based on various attributes of the media content to be classified, and presented to a user of the application/service for configuration, or as a default setting for classifying media contents. In some embodiments, the dimension criteria can be modified by feedbacks from the user, by taking into account a user's historical interactions with the categorized images, and the like.

For each image in the collection of images, features associated with at least one dimension are retrieved with respect to the image. As used herein, the term "dimension" refers to an attribute or a property associated with a piece of content (e.g., an image, etc.). For example, a dimension can include a dimension of time (e.g., taken in the past two years, taken between years 2015 and 2017, etc.), a dimension of location (e.g., taken in Napa Valley, etc.), a dimension of content (e.g., taken with the family, taken at a birthday party, taken with skyscrapers, etc.), a dimension of source (e.g., captured by a particular type of camera, downloaded from the Internet, etc.), a dimension of visual features (e.g., colors and textures) etc. It should be understood that any type and any number of dimensions can be applied herein without limitation to derive feature information for the purpose of classifying images into categories of images with finer granularity and diverse dimensions, resulting in simplified searches of images later on.

According to various embodiments of the present disclosure, feature information includes content characteristics such as target image features, target context features, image source features, and the like. Target image features can include image features associated with an image itself, such as taken with people and/or scenery. Target context features can include context information associated with an image, such as image acquisition date and/or time, and image acquisition location. Source features can include source information associated with how an image is generated or obtained. For example, source features can include information that indicates an image is obtained by downloading from the Internet, by performing a screenshot capture, by photographed by a camera or smart phone, etc.

In some embodiments, the retrieving of feature information associated with at least one dimension includes one or more of the following. First, target image features corresponding to each image in the collection of images are retrieved based on the above-described image features. Second, target context features corresponding to each image in the collection of images are retrieved based on the descriptive information associated with the image, the descriptive information annotating images with the above-described context information. Third, source features corresponding to each image in the collection of images are retrieved based on the above-described source information.

In implementations, when image features are used to identify feature information, image data can be analyzed to identify target image features. For example, an image can be analyzed by for example, a content-based image retrieval (CBIR) engine, to recognize whether it captures subjects such as people, sceneries, selfies, party scenes, and the like. When descriptive information is used to identify target context features, information such as image acquisition time falling in the past week, and/or image acquisition location being at Beijing is identified as target context features. When source information is used to identify source features, information such as images being downloaded from the Internet, images being photographed, image being captured as a screenshot, and the like is identified as source features.

In some embodiments, when image features are used to identify target image features, an image feature analysis is performed for each image to determine its respective image features. In implementations, the similarity of an image feature to a predefined standard image feature (e.g., scenery, people) is computed in the form of a degree of similarity. If the computed degree of similarity exceeds a pre-configured threshold, the predefined standard image feature is identified as a target image feature corresponding to the image.

In some embodiments, target image features are determined based on information pertaining to the device which is utilized to obtain an image as well as operations associated with an image. For example, when a user captures a photograph using the camera of a smart phone with a special mode of photograph setting, oftentimes the camera and its associated software are configured to recognize faces in its view for the purpose of capturing high quality images. Thus, target image features can be identified based on the operations performed by the acquisition camera or device. When it is detected that a photograph is captured while triggering the face recognition of a single person, the corresponding target image feature can be identified as an image of a single person's presence. Likewise, based on the detection that a photograph is captured while triggering the face recognition of a group of people (e.g., multiple instances of face recognitions), the corresponding target image feature can be identified as an image at a party or meeting.

Furthermore, with the popularity of social media and messaging Apps, oftentimes a user shares an image from a terminal device (e.g., a photograph captured using a smartphone) using various Apps with either a single user or a community of other users. For example, the user can upload a photograph onto his or her Facebook wall, or post a photograph on a WeChat group. Typically, upon sharing the photograph, the user inputs separate textual descriptions along with sharing the photograph, and/or tags photos with photo tags (e.g., tags a person in a Timeline photo at a Facebook™ page) to supplement the sharing of content. As another example, when the user performs a screenshot of a web page and subsequently shares the screenshot, information embedded in the image version of the web page or a portion of the web page provides description with respect to the content of the screenshot image in a self-descriptive manner. Therefore, based on the sharing of content (e.g., images, screenshots) as well as the ancillary information associated with the shared content (e.g., the above-described textual description and photo tags), target image features can be identified for the shared content. Thus, when the user shares images via applications such as WeChat, RenRen, Instagram, Facebook, and blogs, people shown in the images can be associated with their respective account information. Thus, based on the image acquisition information and/or sharing information, the target image features can be obtained.

In some embodiments, when descriptive information associated with images is used to identify target context features, an analysis is performed for each image to determine its respective target context features. In implementations, information pertaining to time/date and/or locations is retrieved and designated as target context features. For example, time/date information can include image acquisition time/date information pertaining to the time/date when an image is downloaded from the Internet, or captured as a screenshot, or photographed. Location information can include geo-location information where a photograph is captured, or an image is downloaded or captured as a screenshot.

In particular, different descriptive information is obtained corresponding to different types of images. Typically, metadata is stored in a header region within an image file. Taking the JPEG format for example, metadata is stored in EXIF (exchangeable image file format) format, which is a standard that specifies the formats for images, sound, and ancillary tags generated by use of devices such as cameras, smart phones, scanners, etc. In general, EXIF data includes data pertaining to the conditions of image acquisition (e.g., date and time information, camera setting such as the focal length, aperture, shutter speed, ISO speed, flash settings, color space, white and color balance settings, etc.), data pertaining to the model of camera and manufacturer, data pertaining to the size of original image, data pertaining to the orientation of the original image, data pertaining to the JPEG compression, data pertaining to audio data, data pertaining to thumbnails, data pertaining to GPS data, and so on. Thus, data can be retrieved as the descriptive information associated with JPEG images to determine target context features.

In some embodiments, when source information associated with images is used to identify source features, an analysis is performed for each image to determine its respective source features. In implementations, information pertaining to the source from which an image is downloaded or stored or generated is retrieved and designated as source features.

In particular, since images can be generated or stored via various manners, source features can be identified based on the source information associated with images during the process of browsing through the images to be classified. For example, storage sources can be determined based on the titles a user gives to a default folder, a designated folder, a network or cloud-based folder, all of which store images to be classified. On the other hand, for images captured by using a camera or smart phone, or downloading from the Internet, or performing a screenshot operation, generation sources and storage sources can be determined accordingly, based on which source features can be identified as well.

At 206, content categories are determined based on the feature information.

According to various embodiments of the present disclosure, feature information is used to determine categories for each image. In some embodiments, one category can correspond to one or more features. For example, a category can be associated with at least one of the following dimensions: time, location, image features, and source. In particular, a category pertaining to a time dimension can be further classified into sub-categories of images taken "within half a year," "before half a year," "before a year," and so on. A category pertaining to a location dimension can be further classified into sub-categories of images taken at "Beijing," "Shanghai," "Hangzhou," and so on. A category pertaining to image features can be further classified into sub-categories of images taken as "scenery," "people," "selfies," "trips," and so on. A category pertaining to a source dimension can be further classified into sub-categories of images "downloaded from the Internet," "screenshots," "photographs," and so on. A category pertaining to a location dimension and image feature dimension can be classified into categories of images taken on "trip to Hangzhou," "trip to Lijiang," and so on.

At 208, images classified into the same category are grouped into a collection of categorized images.

Once the categories are determined based on the feature information associated with images, the images classified into the same category are in turn grouped together as a categorized collection of images. Here, categories are not exclusive of each other, therefore different categorized collections may include the same images. In other words, an image can be included in multiple categorized collections of images.

At 210, content labels are determined for each determined category.

According to various embodiments of the present disclosure, each category is configured with a content label, which is used to tag the categorized collection of images corresponding to the category for the purpose of facilitating the management of and interaction with images by a user. Once the categorized collections of images are generated corresponding to the determined categories, content labels can be determined based on the categories. In some embodiments, one category can be annotated with one content label, which is determined based on information such as the titles of the categories, and/or descriptive information of the categories. For example, for the categories determined along the time dimension, the descriptive information of "taken before half a year" can be used to derive a corresponding content label as "before half a year;" while the descriptive information of "taken at the anniversary" can be used to derive a corresponding content label as "anniversary." For another example, for the categories determined along the location dimension, the category titles of "Lijiang" and "Hangzhou" can be used to derive content labels as "Lijiang" and "Hangzhou," respectively. Likewise, based on the category titles and descriptions, corresponding content labels can be determined as "Flowers and Plants," "Houhai," "Kids," "Trip to Lijiang," and so on. In some embodiments, a content label includes a title for display at a user interface.

At 212, display information associated with a content label corresponding to a category is determined based on a priority level, which is determined for each category.

According to various embodiments of the present disclosure, given the fact that multiple categories can be identified with corresponding multiple labels, in order to provide an intuitive presentation of content labels for a user's interaction at a user interface, each category is configured with a priority level. Based on the priority levels, display information is configured for each content label corresponding to the categories. The display information is configured to specify a display area at a user interface where the corresponding content label is to be displayed. In some embodiments, the higher a priority level, the more prominent display area the display information is configured with. For example, such display information can indicate a relatively larger display area for display, and/or a more prominent location at the user interface for display.

In some embodiments, a priority level is determined based on attributes associated with the respective category. Attributes associated with a category can be determined based on properties associated with the images classified into that particular category. Properties associated with images of the category can include information relating to information such as image dimensions, (e.g., time, location, image features), the quantity of images belonging to the category, the user's operations (e.g., number of sharing times) upon the images belonging to the category, and the like. For example, the larger the number of images of a category, the higher its priority level and the larger a display area the corresponding display information is specified. Similarly, the closer the image acquisition time is to the present, the higher the category's priority level and the larger a display area the display information is specified; the closer the image acquisition location is to the present location of a user, the higher the category's priority level and the larger a display area the display information is specified.

In some embodiments, the determination of attributes associated with categories and the determination of priority levels based on the category attributes includes at least one of the following mechanisms. First, the number of images in the categorized collection corresponding to the respective category is obtained, and a priority level is determined based on the number of images. Second, rankings of dimensions associated with the dimensions along which categories are classified are obtained, and the priority levels are determined based on the rankings of dimensions. Subsequently, the display information corresponding to the content labels is determined based on the corresponding priority level associated with the categories.

In particular, a ranking of particular dimension can be obtained according to the rankings of all the dimensions along which images are classified. For example, a ranking can be obtained with regard to a ranking of time dimension, location dimension, and so on. The rankings can include an overall ranking of all dimensions based on which the images are classified. The ranking can also include an individual ranking performed within one dimension. For example, a ranking of overall dimensions can be pre-configured in a descending order of: time dimension, image feature dimension, location dimension, and source dimension. Such pre-configuration can be defined by a user, or as a default yet configurable setting associated with a content management application/service. With an overall ranking determined, rankings internal to an individual dimension can be obtained accordingly. For example, within the top-ranking time dimension, internal ranks are generated according to, for example, the lapse of time between a reference point of time and image acquisition time; within the bottom-ranking source dimension, internal ranks are also generated in a descending order of: being captured by a camera/smart phone, being captured as screenshots, and being downloaded from the Internet. With the afore-described overall rankings and internal rankings, as the time dimension is ranked at the highest order in the overall ranking and the sub-dimension corresponding to a timestamp closet to the present is also ranked at the highest order in the ranking internal to the time dimension, accordingly, a highest priority level is assigned to the content label corresponding to the time dimension and having a timestamp closest to the present. Similarly, as the source dimension is ranked at the lowest order in the overall ranking and the sub-dimension corresponding to being downloaded from the Internet is also ranked at the lowest order in the ranking internal to the source dimension, accordingly, a lowest priority level is assigned to the content label corresponding to the source dimension and having a source feature as being downloaded from the Internet. In some embodiments, different criteria are applied to generate internal rankings within an individual dimension, even though a same level of priority can be assigned to the same ordered position within rankings. For example, the highest priority level is assigned to the number of images, the next highest priority level is assigned to the image acquisition time, then to the image acquisition location, and so on. As such, a ranking of the numbers of images associated in each category is first obtained. For those categories having the same numbers of images (e.g., the same ranking in terms of the image quantity), a ranking of the image acquisition time is used to generate a ranking at the next priority level, and so on. Therefore, all the categories are annotated with corresponding priority levels, based on which the display information associated with the content labels corresponding to the categories is configured.

In some embodiments, the display information associated with a content label is configured to specify appearance information in the context of a user interface for the content label. In other words, the look and feel of the displaying of a content label on the user interface can be determined based on the attributes associated with the respective category. For example, appearance information can include information relating to at least one of the following: shape, color, animation effect, and the like. In some embodiments, the display information specifies an interface element to be displayed representing the respective content label and a corresponding categorized collection of images. As used herein, the term "interface element" or "element" refers to components or a group of components of a user interface. For example, interface elements include, a round-shaped region (e.g., bubbles) or a square-shaped region, and the like.

Additionally, the display information further specifies corresponding colors for the afore-described interface elements. In some embodiments, different shapes, colors, and/or animation effects are indicated based on parameters such as the afore-described rankings of dimensions, the numbers of images associated with the respective categorized collections, and priority levels associated with the categories.

At 214, the content label is displayed based on the display information.

Once the content labels and their respective display information (e.g., the display areas and appearance settings) are determined, the content labels can be displayed at a user interface based on the respective display information. For example, the content labels corresponding to the categorized collection of images are displayed at a user interface of a display screen of a smart phone. More details are described below with reference to FIGS. 3A-3C.

At 216, in response to a user's selection upon a content label, images classified into the category corresponding to the content label are displayed.

Presented with the visual arrangement of the content labels displayed according to the respective display information, a user can navigate through and interact with the interface elements displaying the corresponding categories of images by, for example, clicking on the interface element representing the content label and its corresponding categorized collection of images. In response to a user's selection upon a content label, images associated with the category are displayed to the user. More details are described in below with reference to FIGS. 3A-3C.

In some embodiments, the images available for classification at a terminal device are included in a dynamic repository of images. For example, a user can delete some of the images, and add some new images to the repository. Accordingly, in the case where an image is deleted by the user, the image is also removed from the collection of images. In the case where new images are expected to be added, the detection of newly added images can be performed, for example, periodically to determine whether the repository has been augmented with new entries. If so, step 204 is executed to determine the feature information pertaining to the new images, which is used to classify the new images into its corresponding categorized collection of images. Otherwise, if there are no new images added to the repository, process 200 concludes.

In some embodiments, the deletion and addition of images to the repository is also used to update the display information associated with the respective content labels to reflect updated display parameters such as the display area, the display appearance settings, etc. For example, with images being deleted from the repository, the total number of images in a particular category may be reduced so that the particular category no longer has the largest number of images. Therefore, the display information associated with the content label corresponding to the category is updated to re-configure the display area as, for example, the second largest area occupying a second most prominent location at a user interface.

In operations, the categorization and presentation of the entire collection of images of a user plays an essential role in the user experience in terms of managing and interacting with the images. Given the fact that each image includes data indicating information such as acquisition time, acquisition location, etc., and each image captures certain features and/or objects such as sceneries, animals, plants, flowers, people, buildings, etc., images are classified along multiple dimensions to facilitate a more intuitive arrangement of the categorized images for user navigation and selection. For example, information pertaining images is recorded to include data such as time, location, people's identities, etc. Further, operational information pertaining to images is also recorded to include data such as the frequency of access, frequency of sharing, etc. In some embodiments, comprehensive information pertaining to images is recorded to include the total number of images under each category. With such information, keywords that annotate images are retrieved from the entire collection of images and presented in the form of a content label. In implementations, the size, shape and location at a user interface for displaying content labels can be configured to intuitively illustrate the relative importance and/or likelihood of user interest inherent in a categorized collection of images, as well as relative relationships between various content labels (e.g., the relatedness between content labels displayed).

Taking a photo App on a smart terminal device for example, categorized images can be intuitively displayed to a user of the smart terminal device according to various embodiments of the present disclosure. In particular, the process includes three steps: collection, categorization, and presentation.

First at the collection step, information pertaining to the images for classification is obtained. In some embodiments, the following three types of information are obtained for each image in the repository of images and stored at, for example, a database.

First, image features are retrieved from an image and input to a feature classifier to compare the retrieved features to the pre-configured standard features. In some embodiments, a feature classifier can be implemented by a CBIR engine such as an IBM™ QBIC engine, a MIT's photobook engine. If the comparison result indicates a degree of similarity exceeding a pre-configured threshold, the image is annotated with a content label corresponding to the standard feature. Because multiple classifiers corresponding to multiple semantic labels can be applied to an image, such an image can be annotated with more than one content labels.

Second, the image acquisition time is retrieved from an image. For example, a capture time recorded in the EXIF section of an image file can be retrieved as the image acquisition time.

Third, the image acquisition location is retrieved from an image. For example, a capture location recorded in the EXIF section of an image file can be retrieved as the image acquisition location.

Next at the step of categorization, images classified with the same features are grouped into one categorized collection of images. For example, images having the same acquisition location are grouped into one category, images having an acquisition time close to each other or falling within a specified period of time are grouped into another category, and so on. In some embodiments, in order to facilitate more precise categorization based on the time dimension of images, more detailed time information related content labels are configured to specify categories such as images taken within this week, within this month, within half a year, before half a year, and the like. As such, categorized collections of images are obtained corresponding to respective categories. Subsequently, statistical information such as the total number of images under each category is obtained. Based on the statistical information, the categorized collections of images are ranked and stored accordingly.

Lastly at the step of presentation, the display area for a content label can be dynamically adjusted to reflect the attributes associated with the images of a categorized collection. For example, the display information can be adjusted to reflect the total number of images under the categorized collection corresponding to the content label. In order to better accommodate a user's expectation, the categories of images are displayed according to the priority levels. As a result, a user can intuitively apprehend the quantity of images of a category in relation to the entire collection by observing the size of the display area representing the category on the user interface.

In some embodiments, at the top section of the Photo App's user interface, a portion of the content labels is displayed. Upon user's execution of a swipe-down operation or the like, all the content labels are displayed at the entire user interface. Likewise, upon a user's execution of a swipe-up operation or the like, the user interface is restored to display only a portion of the content labels at its top section. Here, the content labels are displayed according to the number of images associated therewith, and/or the degree of relatedness. Upon a user's selection of a content label, the images of the categorized collection corresponding to the selected content label are displayed.

Figures 3A, 3B:
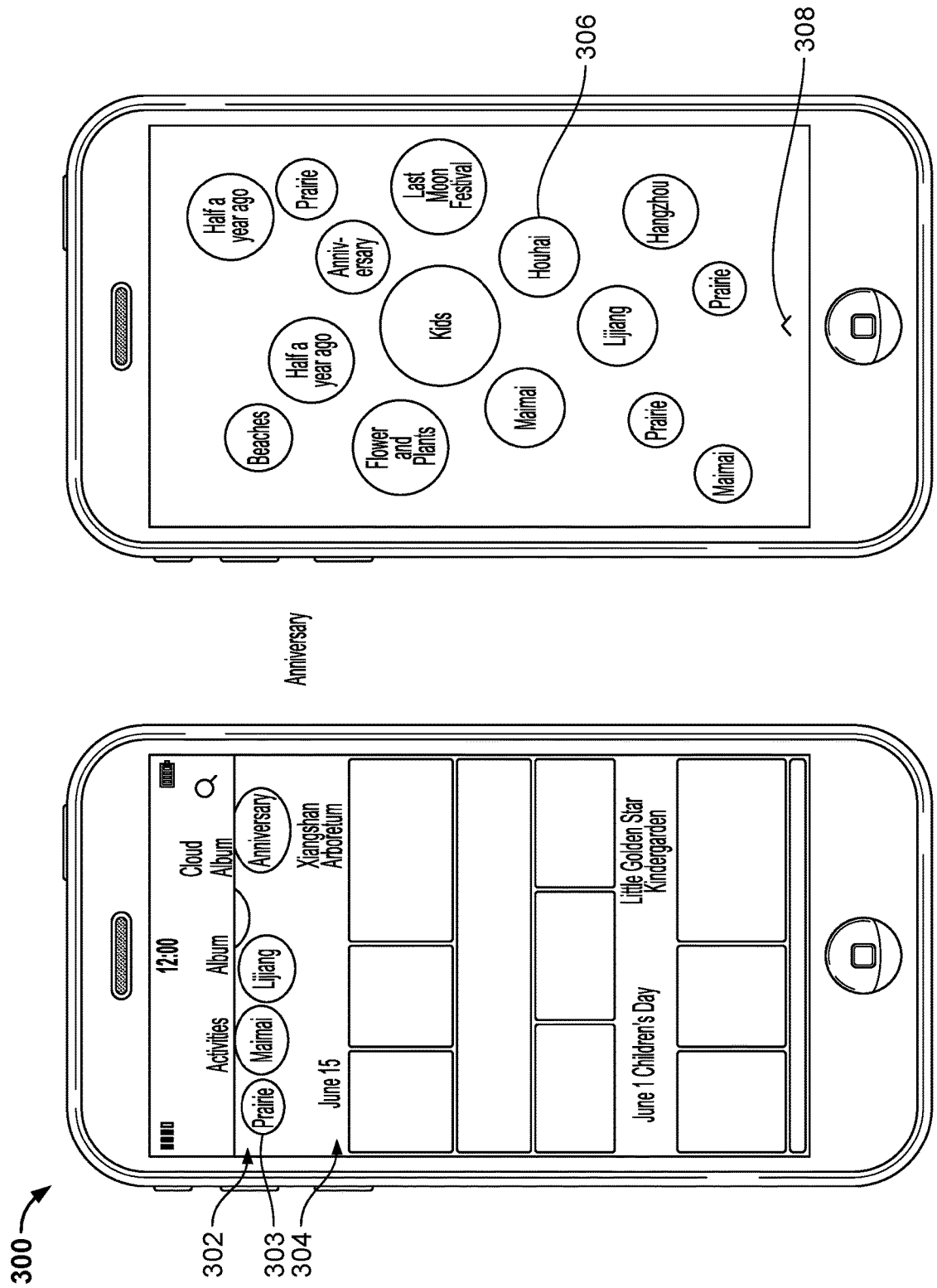
FIGS. 3A-3C are schematic diagrams illustrating an example user interface for interacting with content, in accordance with one or more embodiments of the present disclosure.
Figure 3C:
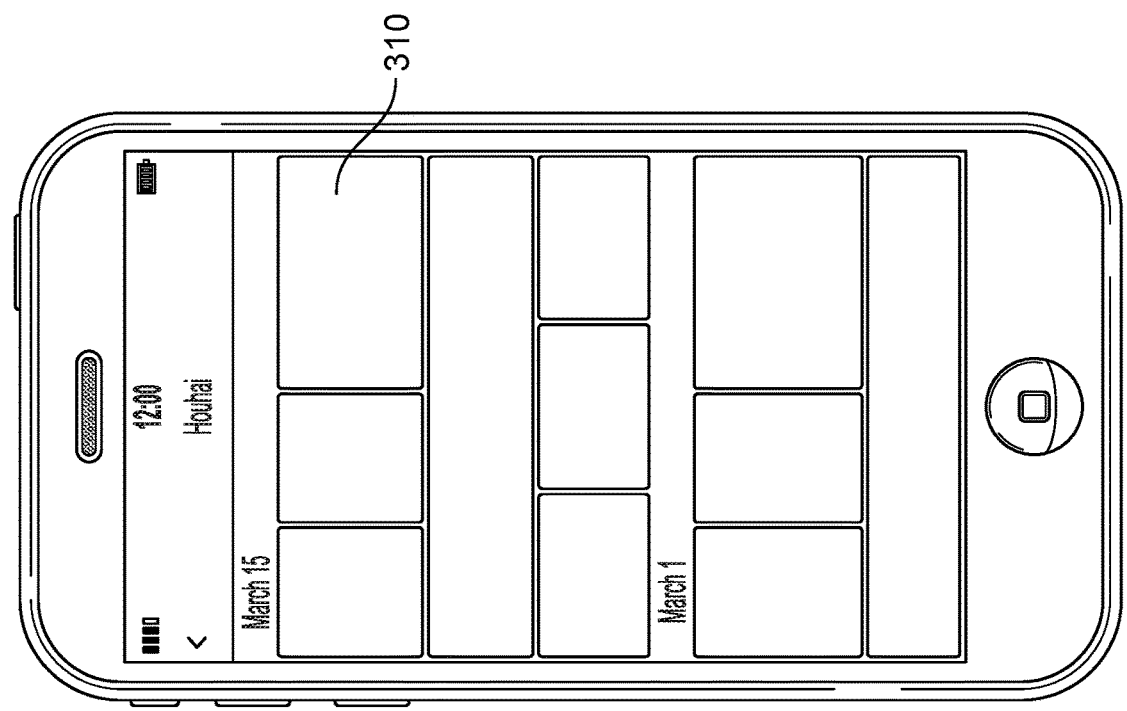

FIGS. 3A-3C illustrate a series of schematic diagrams of a portion of an example user interface for managing and interacting with content, in accordance with an embodiment of the present disclosure. Here, user interface 300 is configured as part of an image application executing on a terminal device, which can be implemented at, for example, system 400 of FIG. 4.

User interface 300 can be configured to present content labels at one side of its display region based on the respective display information. Upon receiving a user's command (e.g., a user's downward swiping gesture), the displaying of the content labels is expanded into the entire display region of user interface 300. Here, displaying elements corresponding to the present image application are configured based on the respective display information. Next, the displaying elements are presented at user interface 300 to the user. As shown herein, displaying elements 303 are displayed in a portion (e.g., upper portion 302) of user interface 300 to represent the corresponding content labels, while another portion (e.g., lower portion 304) of user interface 300 is configured to display the images grouped into categorized collections ranked in the above-described manner. For example, portion 304 can be configured to display the categorized collections of images in the order such that a highest priority level is assigned to the content label corresponding to the time dimension and having a timestamp closest to the present. As shown herein, as the categorized collection of images under the content label of "June 15" is ranked higher than those under the content label of "June 1 Children's Day," portion 304 is configured to display the categorized collections of images labeled with "June 15" above those labeled with "June 1 Children's Day." In some embodiments, portion 304 can also be configured to display categorized collections of images with a scrollable manner. In some embodiments, portion 304 is configured to display categorized collections of images according to an order other than the afore-described ranks. For example, portion 304 can be configured to display the categorized collections of images in an order ranked according to the size/shape of their corresponding content labels. For another example, portion 304 can be configured to display the categorized collections of images in an order ranked according to the frequency at which a user accesses the images in the respective categories. Subsequently, as described with more detail with reference to FIG. 3B, upon the user's operation of a pre-configured command (e.g., scrolling, swiping, clicking, hand gesture), the displaying of the content labels is expanded from upper portion 302 to occupy the entire user interface 300.

In some embodiments, prior to displaying the content labels based on the display information, a set of first N number of content labels is determined based on the display area of the display information. Next, the set of first N number of content labels are displayed with priority. Because most terminal devices are limited in terms of the size of their display screen (e.g., a smart phone typically is equipped with a touch screen that is relatively small-sized), the content labels can be ranked according to the respective configuration of display area at a user interface. For example, the content labels can be ordered in a descending manner in terms of the display area configured for the content labels. Thus, the first N number of content labels from the ranked list is obtained as the set of first N number of content labels for display either at the entire user interface 300, or at upper portion 302 of user interface 300. As shown here in FIG. 3A, the first five (5) content labels of "Prairie," "Maimai," "Lijiang," "Anniversary," and one not shown due to a partially displayed element 303 are presented at portion 302 of user interface 300 first. In some embodiments, the number N can be determined taking into account both the size of the display screen and the size/shape/location configured for the display area. It should be understood that any suitable criteria can applied herein without limitation.

As shown in FIG. 3B, user interface 300 presents a multitude of displaying elements 306 representing a multitude of content labels. In some embodiments, displaying elements 306 are configured based on the display information (e.g., shape, size, color, location) associated with the content labels. As shown herein, displaying elements 306 are dispersed over user interface 300. The arrangement of displaying elements 306 can be randomly distributed, or configured according to the display area specified in the respective display information. As shown in FIG. 3B, those displaying elements 306 having relatively large display areas are arranged in the middle of user interface 300, while those displaying elements 306 having a relatively small display areas are arranged in the periphery of user interface 300.

In some embodiments, after being displayed at user interface 300, the content labels can be un-displayed according to predetermined user commands. In other words, upon receiving a user operation (e.g., swiping to the top, to the bottom, to the left and to the right, shaking, etc.) that triggers a pre-configured command to exit the displaying of the content labels, user interface 300 is rendered to no longer displaying a plurality of content labels. In some embodiments, user interface 300 is configured to display images instead. In some embodiments, user interface 300 is configured to exit the image application. Any suitable techniques can be applied herein to exit the displaying of content labels. For example, the display of content labels can disappear along the direction a user inputs a swiping operation. As another example, upon detecting a shaking operation, the terminal renders the display as collapsing towards the center line of user interface 300 until disappearing entirely. In some embodiments, a designated icon is configured at a user interface when the content labels are displayed. As shown herein, upon a user selecting a triangle icon 308 at user interface 300, the displaying of content labels is rendered disappearing.

Presented with the content labels displayed at user interface 300, the user can navigate through and search images based on the displayed content labels with enhanced efficiency. For example, the user can select a content label by clicking on the corresponding displaying element to trigger the displaying of the images corresponding to the selected content label. As shown here in FIG. 3C, in response to the user clicking on displaying element 306 that corresponds to the label "Houhai," images 310 belonging to the category of "Houhai" are displayed at user interface 300. Here, images in this category are displayed according to the time dimension information.

Figure 4:
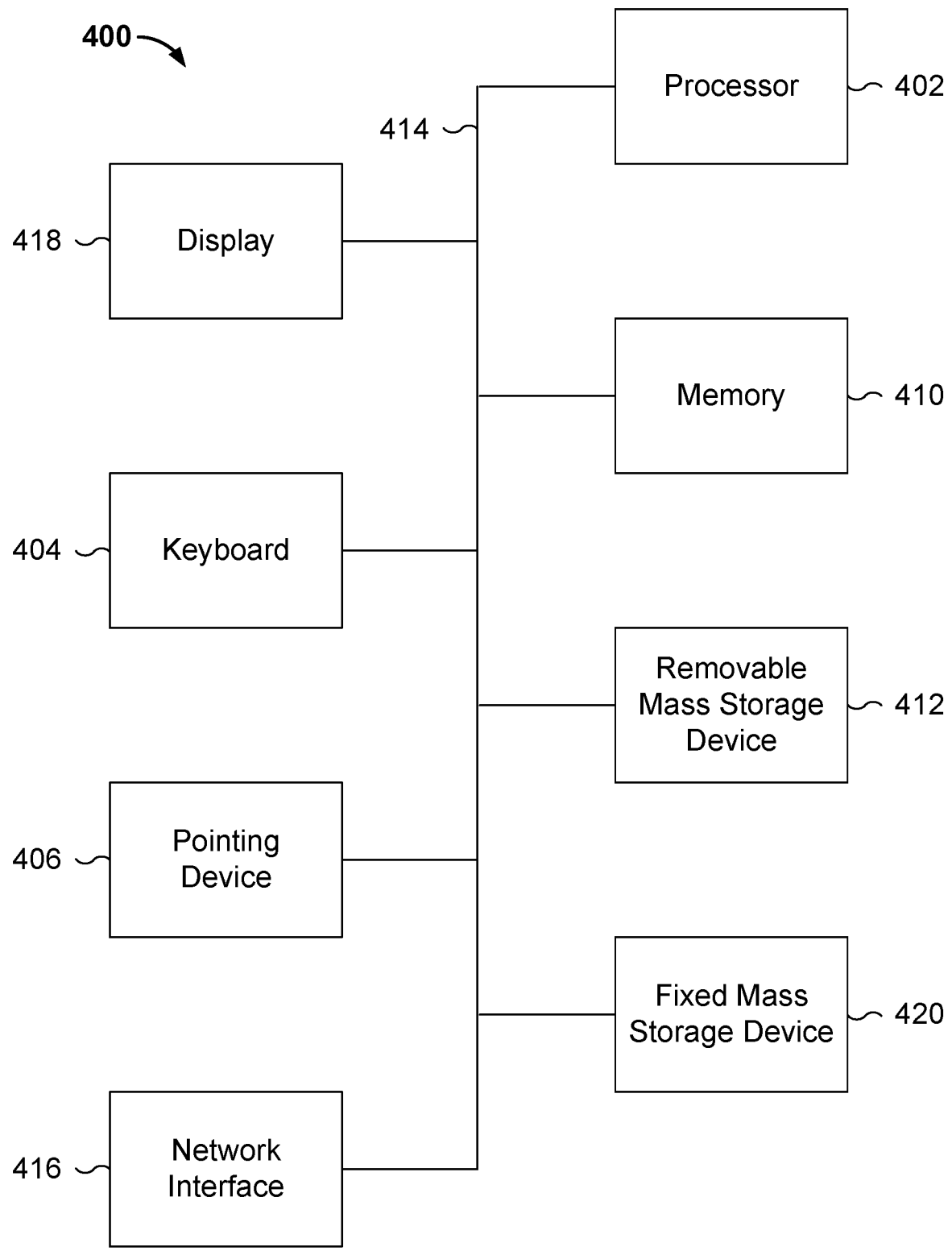
FIG. 4 is a functional diagram illustrating an embodiment of a programmed computer system for content processing, in accordance with one or more embodiments of the present disclosure.

FIG. 4 is a functional diagram illustrating an embodiment of a programmed computer system for content processing. As will be apparent, other computer system architectures and configurations can be used to process content. Computer system 400, which includes various subsystems as described below, includes at least one microprocessor subsystem (also referred to as a processor or a central processing unit (CPU)) 402. For example, processor 402 can be implemented by a single-chip processor or by multiple processors. In some embodiments, processor 402 is a general purpose digital processor that controls the operation of the computer system 400. Using instructions retrieved from memory 410, the processor 402 controls the reception and manipulation of input data, and the output and display of data on output devices (e.g., display 418). In some embodiments, processor 402 includes and/or is used to provide the launch of a client application based on a message.

Processor 402 is coupled bi-directionally with memory 410, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storages can also store programming instructions and data, in the form of data objects and text objects, in addition to other data and instructions for processes operating on processor 402. Also as is well known in the art, primary storage typically includes basic operating instructions, program code, data, and objects used by the processor 402 to perform its functions (e.g., programmed instructions). For example, memory 410 can include any suitable computer readable storage media, described below, depending on whether, for example, data access needs to be bi-directional or uni-directional. For example, processor 402 can also directly and very rapidly retrieve and store frequently needed data in a cache memory (not shown).

A removable mass storage device 412 provides additional data storage capacity for the computer system 400 and is coupled either bi-directionally (read/write) or uni-directionally (read only) to processor 402. For example, storage 412 can also include computer readable media such as magnetic tape, flash memory, PC-CARDS, portable mass storage devices, holographic storage devices, and other storage devices. A fixed mass storage 420 can also, for example, provide additional data storage capacity. The most common example of fixed mass storage 420 is a hard disk drive. Mass storages 412, 420 generally store additional programming instructions, data, and the like that typically are not in active use by the processor 402. It will be appreciated that the information retained within mass storages 412 and 420 can be incorporated, if needed, in standard fashion as part of memory 410 (e.g., RAM) as virtual memory.

In addition to providing processor 402 access to storage subsystems, bus 414 can also be used to provide access to other subsystems and devices. As shown, these can include a display 418, a network interface 416, a keyboard 404, and a pointing device 406, as well as an auxiliary input/output device interface, a sound card, speakers, and other subsystems as needed. For example, the pointing device 406 can be a mouse, stylus, track ball, or tablet, and is useful for interacting with a graphical user interface.

The network interface 416 allows processor 402 to be coupled to another computer, computer network, or telecommunications network using a network connection as shown. For example, through the network interface 416, the processor 402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 402 can be used to connect the computer system 400 to an external network and transfer data according to standard protocols. For example, various process embodiments disclosed herein can be executed on processor 402, or can be performed across a network such as the Internet, intranet networks, or local area networks, in conjunction with a remote processor that shares a portion of the processing. Additional mass storage devices (not shown) can also be connected to processor 402 through network interface 416.

An auxiliary I/O device interface (not shown) can be used in conjunction with computer system 400. The auxiliary I/O device interface can include general and customized interfaces that allow the processor 402 to send and, more typically, receive data from other devices such as microphones, touch-sensitive displays, transducer card readers, tape readers, voice or handwriting recognizers, biometrics readers, cameras, portable mass storage devices, and other computers. Persons skilled in the art may clearly understand that, for the sake of descriptive convenience and streamlining, one may refer to the processes in the aforesaid method embodiments that correspond to specific work processes of the systems, devices, and units described above. They will not be discussed further here.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, (transitory media), such as modulated data signals and carrier waves.

A person skilled in the art should understand that embodiments of the present application can be provided as methods, systems, or computer program products. Therefore, the present application can take the form of an entirely hardware embodiment, an entirely software embodiment, or an embodiment that combines software and hardware aspects. In addition, the present application can take the form of computer program products implemented on one or more computer-operable storage media (including but not limited to magnetic disk storage devices, CD-ROMs, and optical storage devices) containing computer operable program codes.

The present application is described with reference to flowcharts and/or block diagrams based on methods, devices (systems), and computer program products of embodiments of the present application. Please note that each process and/or block within the flowcharts and/or block diagrams and combinations of processes and/or blocks within the flowcharts and/or block diagrams can be realized by computer commands. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command devices. These command devices implement the functions specified in one or more processes in a flow chart and/or one or more blocks in a block diagram.

Although preferred embodiments of the present application have already been described, persons skilled in the art can make other alterations and modifications to these embodiments once they grasp the basic creative concept. Therefore, the attached claims are to be interpreted as including the preferred embodiments as well as all alterations and modifications falling within the scope of the present application.

Obviously, a person skilled in the art can modify and vary the present application without departing from the spirit and scope of the present application. Thus, if these modifications to and variations of embodiments of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for content processing, comprising:
   classifying a plurality of media content items into corresponding categories;
   determining, based at least in part on a category, a content label and display information associated with the content label, wherein:
      the category corresponds to an item of media content;
      the content label corresponds to the category; and
      the display information indicates a display area for displaying the content label on a display interface, wherein determining the content label further includes determining a priority level corresponding to the category based at least in part on a set of images that has been classified into the category, wherein the display information associated with the content label is determined based at least in part on the priority level;
   displaying the content label based at least in part on the display information on the display interface;
   detecting an addition or removal of one or more media content items with respect to the plurality of media content items;
   in response to the addition or removal of the one or more media content items with respect to the plurality of media content items, classifying an updated set of images into the category;
   determining an updated priority level corresponding to the category based at least in part on the updated set of images; and
   determining updated display information associated with the content label based at least in part on the updated priority level.

2. The method of claim 1, wherein the determining of the priority level corresponding to the category comprises:
   determining one or more attributes associated with the category; and
   determining the priority level based at least in part on the determined one or more attributes.

3. The method of claim 2, wherein the one or more attributes comprises at least one of the following: a dimension attribute, a quantity attribute, and/or an operation attribute.

4. The method of claim 3, wherein the determining of the one or more attributes associated with the category and the determining of the priority level based at least in part on the one or more attributes comprises at least one of the following:
  obtaining a number of items of media content corresponding to the category and determining the priority level associated with the category based at least in part on the number of the items of media content; and/or
  obtaining dimension rank information corresponding to the dimension attribute associated with the category and determining the priority level associated with the category based at least in part on the dimension rank information.

5. The method of claim 3, wherein the dimension attribute includes at least one of the following: a dimension of time, a dimension of location, a dimension of image feature, and/or a dimension of source.

6. The method of claim 1, wherein the display area associated with the content label is configured to occupy an area larger than content labels associated with a lower priority level.

7. The method of claim 1, wherein the display information includes information that specifies one or more appearance settings associated with the content label when displayed on the display interface, wherein the one or more appearance settings include at least one of: a shape attribute, and/or color attribute.

8. The method of claim 1, wherein the displaying of the content label based at least in part on the display information comprises:
  dispersing the content label on the display interface based at least in part on the display information.

9. The method of claim 1, wherein the displaying of the content label based at least in part on the display information comprises:
  configuring the content label to a designated area on the display interface based at least in part on the display information; and
  expanding, upon receiving a pre-configured command, the designated area displaying the content label to occupy a larger area of the display interface.

10. The method of claim 9, wherein the pre-configured command includes a user operation.

11. The method of claim 9, wherein the larger area of the display interface includes an entire display region of the display interface.

12. The method of claim 1, further comprising, prior to the displaying of the content label based at least in part on the display information:
  determining a set of one or more content labels based at least in part on respective display areas; and
  displaying the set of one or more content labels.

13. The method of claim 1, further comprising:
  determining feature information associated with the item of media content by retrieving information pertaining to at least one dimension of the item of media content; and
  grouping items of media content based on categories corresponding to the feature information to obtain categorized a collection of items of media content.

14. The method of claim 13, wherein the retrieving of the information pertaining to the at least one dimension of the item of media content comprises:
  determining target image features based on retrieved image features; and/or
  retrieving target context features from descriptive information associated with the item of media content; and/or
  retrieving source features from source information associated with the item of media content.

15. A system for content processing, comprising:
one or more processors configured to:
  classify a plurality of media content items into corresponding categories;
  determine, based at least in part on a category, a content label and display information associated with the content label, wherein:
    the category corresponds to an item of media content;
    the content label corresponds to the category; and
    the display information indicates a display area for displaying the content label on a display interface, wherein to determine the content label further includes to determine a priority level corresponding to the category based at least in part on a set of images that has been classified into the category, wherein the display information associated with the content label is determined based at least in part on the priority level;
  display the content label based at least in part on the display information on the display interface;
  detect an addition or removal of one or more media content items with respect to the plurality of media content items;
  in response to the addition or removal of the one or more media content items with respect to the plurality of media content items, classify an updated set of images into the category;
  determine an updated priority level corresponding to the category based at least in part on the updated set of images; and
  determine updated display information associated with the content label based at least in part on the updated priority level; and
one or more memories coupled to the one or more processors, configured to provide the one or more processors with instructions.

16. The system of claim 15, wherein to determine the priority level corresponding to the category comprises to:
  determine one or more attributes associated with the category; and
  determine the priority level based at least in part on the determined one or more attributes.

17. The system of claim 16, wherein the one or more attributes comprises at least one of the following: a dimension attribute, a quantity attribute, and/or an operation attribute.

18. A computer program product for content processing, the computer program product being embodied in a tangible computer readable storage medium and comprising computer instructions for:
  classifying a plurality of media content items into corresponding categories;
  determining, based at least in part on a category, a content label and display information associated with the content label, wherein:
    the category corresponds to an item of media content;
    the content label corresponds to the category; and
    the display information indicates a display area for displaying the content label on a display interface, wherein determining the content label further includes determining a priority level corresponding to the category based at least in part on a set of images that has been classified into the category, wherein the display information associated with the content label is determined based at least in part on the priority level;

displaying the content label based at least in part on the display information on the display interface;

detecting an addition or removal of one or more media content items with respect to the plurality of media content items;

in response to the addition or removal of the one or more media content items with respect to the plurality of media content items, classifying an updated set of images into the category;

determining an updated priority level corresponding to the category based at least in part on the updated set of images; and determining updated display information associated with the content label based at least in part on the updated priority level.

19. The system of claim 17, wherein to determine the one or more attributes associated with the category and to determine the priority level based at least in part on the one or more attributes comprises at least one of the following:

obtain a number of items of media content corresponding to the category and determining the priority level associated with the category based at least in part on the number of the items of media content; and/or obtain dimension rank information corresponding to the dimension attribute associated with the category and determine the priority level associated with the category based at least in part on the dimension rank information.

20. The system of claim 17, wherein the dimension attribute includes at least one of the following: a dimension of time, a dimension of location, a dimension of image feature, and/or a dimension of source.

* * * * *